(12) United States Patent
Varley

(10) Patent No.: US 10,070,592 B2
(45) Date of Patent: Sep. 11, 2018

(54) ROUND BALER AND A METHOD FOR FORMING A BALE FROM A CROP PRODUCT

(71) Applicant: Kverneland Group Ravenna S.r.L., Russi (IT)

(72) Inventor: Seamus Varley, Dublin (IE)

(73) Assignee: Kverneland Group Ravenna S.r.L., Russi (IT)

( * ) Notice: Subject to any disclaimer, the term of this patent is extended or adjusted under 35 U.S.C. 154(b) by 0 days.

(21) Appl. No.: 15/551,969

(22) PCT Filed: Feb. 18, 2016

(86) PCT No.: PCT/EP2016/053451
§ 371 (c)(1),
(2) Date: Aug. 18, 2017

(87) PCT Pub. No.: WO2016/131915
PCT Pub. Date: Aug. 25, 2016

(65) Prior Publication Data
US 2018/0027741 A1   Feb. 1, 2018

(30) Foreign Application Priority Data
Feb. 18, 2015   (EP) ..................................... 15155618

(51) Int. Cl.
*A01F 15/07*   (2006.01)
*A01F 15/08*   (2006.01)

(52) U.S. Cl.
CPC ...... *A01F 15/0833* (2013.01); *A01F 15/0705* (2013.01)

(58) Field of Classification Search
CPC .......................... A01F 15/0833; A01F 15/0705
(Continued)

(56) References Cited

U.S. PATENT DOCUMENTS 4,062,172 A * 12/1977 Rice ..................... A01F 15/0705
100/77
4,534,285 A * 8/1985 Underhill ............ A01F 15/0705
100/88

(Continued)

FOREIGN PATENT DOCUMENTS

DE   102005020777 A1   11/2006
GB      2137926 A      10/1984
(Continued)

OTHER PUBLICATIONS

International Search Report pertaining to PCT Application No. PCT/EP2016/053451, filed Feb. 18, 2016, 3 pages.
(Continued)

*Primary Examiner* — Jimmy T Nguyen
(74) *Attorney, Agent, or Firm* — Dinsmore & Shohl LLP

(57) ABSTRACT

A round baler for forming a bale from a crop product is disclosed and includes a first bale forming chamber; a second bale forming chamber; a feeding mechanism; a transfer mechanism that includes a bottom section of the first bale forming chamber; and a density controller configured to control a density of a preformed bale formed in the first bale forming chamber; wherein the density controller is operably connected to the bottom section. The bottom section is movable with regard to a zero state position, and moves in a negative direction past the zero state position to control the density of the preformed bale and moves in a positive direction returning to the zero state position and beyond the zero state position to transfer the preformed bale into the second bale forming chamber. A method for forming a bale from a crop product in a round baler is described.

17 Claims, 7 Drawing Sheets

(58) Field of Classification Search
USPC .................................................. 100/87, 88
See application file for complete search history.

(56) References Cited

U.S. PATENT DOCUMENTS

| | | | |
|---|---|---|---|
| 5,136,831 A * | 8/1992 | Fell .................... | A01F 15/0705 100/88 |
| 2015/0128551 A1 * | 5/2015 | Van Buuren .......... | A01F 15/071 56/341 |
| 2015/0373916 A1 * | 12/2015 | Roberge .............. | A01F 15/0705 56/341 |

FOREIGN PATENT DOCUMENTS

| | | |
|---|---|---|
| WO | 8402253 A1 | 6/1984 |
| WO | 2013014291 A1 | 1/2013 |

OTHER PUBLICATIONS

Written Opinion pertaining to PCT Application No. PCT/EP2016/053451, filed Feb. 18, 2016, 5 pages.

* cited by examiner

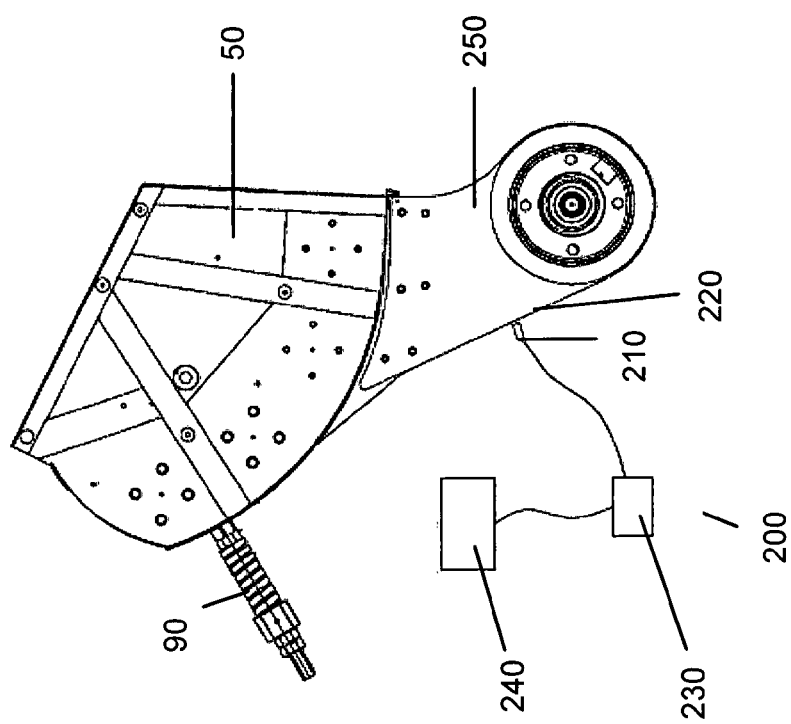

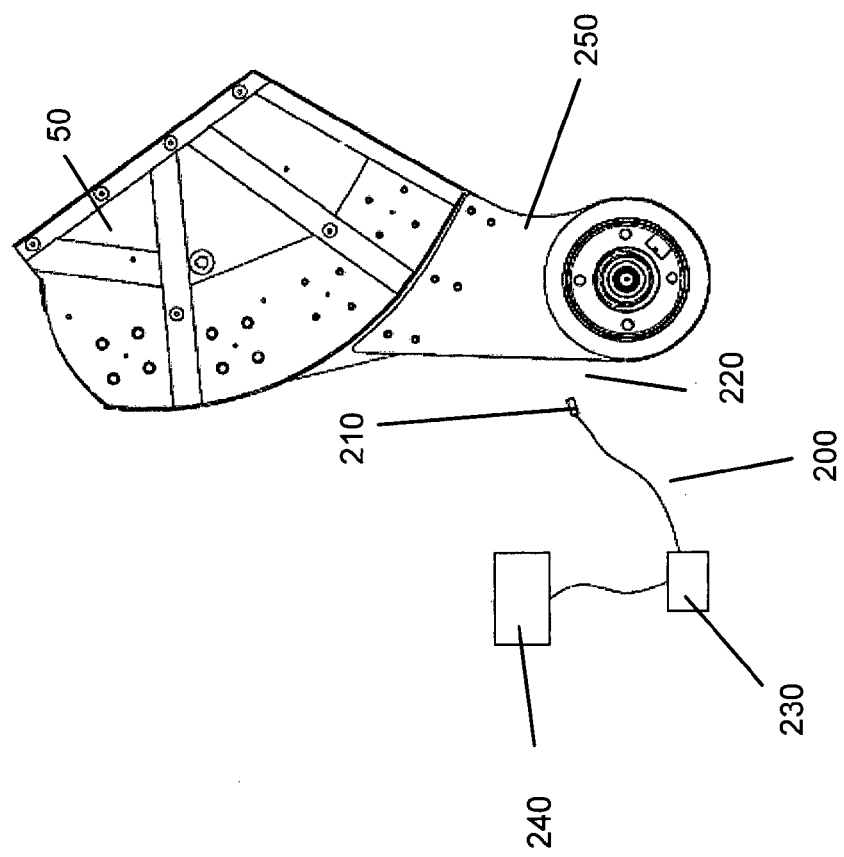

ROUND BALER AND A METHOD FOR FORMING A BALE FROM A CROP PRODUCT

CROSS REFERENCE TO RELATED APPLICATIONS

This application is a U.S. national stage entry under 35 U.S.C. 371 of International Application No. PCT/EP2016/053451, filed Feb. 18, 2016, which claims priority to European Patent Application No. 15155618.0, filed Feb. 18, 2015, the contents of which are hereby incorporated by reference herein in their entirety.

TECHNICAL FIELD

The present disclosure refers to a round baler and a method for forming a bale from a crop product.

BACKGROUND

A round baling apparatus of the fixed chamber type may comprise a baling chamber with rollers and a rearward section of the chamber with rollers being moveable in order to act as a door to release a completed bale from the bale chamber.

For a baling apparatus of the nonstop type as disclosed in the document WO 2013/014291 A1, the baling apparatus consists of two chambers, a first bale forming chamber and a second bale forming chamber. The second bale forming chamber has a standard bale density control system using the main chamber door to move and squeeze the crop into the predefined cylindrical shape. The door moves from a zero position in one direction thereafter only. The first bale forming chamber is also provided with a density control system and provides density control with a different method.

SUMMARY

It is an object to provide a round baler and a method for forming a bale from a crop product providing an improved functionality regarding density control of a round bale.

Following aspects of embodiments of a round baler and a method for forming a bale from a crop product are described.

According to an aspect, a round baler for forming a bale from a crop product is provided. The round baler is comprising a first bale forming chamber provided with a first bale forming mechanism; a second bale forming chamber provided with a second bale forming mechanism; a feeding mechanism, comprising a rotor rotatable around a rotor axis of the feeding mechanism; a transfer mechanism, comprising a bottom section of the first bale forming chamber; and a density controller, configured to control a density of a preformed bale formed in the first bale forming chamber. The density controller is operably connected to the bottom section of the first bale forming chamber. The bottom section is movable with regard to a zero state position, and moving in a negative direction past the zero state position to control the density of the preformed bale and moving in a positive direction returning to the zero state position and beyond the zero state position to transfer the preformed bale into the second bale forming chamber.

According to another aspect, a method for forming a bale from a crop product in a round baler may be provided, the round baler comprising a first bale forming chamber provided with a first bale forming mechanism, and a second bale forming chamber provided with a second bale forming mechanism. The method is comprising: feeding crop into the first bale forming chamber by a feeding mechanism comprising a rotor rotatable around a rotor axis of the feeding mechanism; forming a preformed bale in the first bale forming chamber; controlling a density of the preformed bale by a density controller; and transferring the preformed bale from the first bale forming chamber to the second bale forming chamber by a transfer mechanism comprising a bottom section of the first bale forming chamber. The density controller is operably connecting to the bottom section of the first bale forming chamber. The bottom section is movable with regard to a zero state position, and moving in a negative direction past the zero state position to control the density of the preformed bale and moving in a positive direction returning to the zero state position and beyond the zero state position to transfer the preformed bale into the second bale forming chamber.

The density controller may comprise a preloaded compressing spring. The preloaded compression spring may be manually adjustable for controlling the density of the preformed bale. As an alternative, an automatic control of the density controller may be provided.

The bottom section may rotatable predominately around the rotor axis, and rotating in a negative direction past a zero state position to control the density of the preformed bale and rotating in a positive direction returning to the zero state position and beyond the zero state position to transfer the preformed bale into the second bale forming chamber. The rotor axis may be a central rotor axis of the feeding mechanism.

The round baler may further comprise a density detection system having a sensor for detecting movement of the bottom section. Movement such as rotation of the bottom section may be detected by the sensor by detecting movement of a support element of the bottom section.

The density control mechanism may be adjustable for adjusting the density of the preformed round bale formed in the first baling chamber.

In an embodiment, a contributing factor of a control of the density detection of a first bale forming chamber may be the fact one or more main parts of the chamber have the ability to rotate around a specific axis assigned to the one and/or the more main parts. In an exemplary embodiment, as a result a density control located on the bottom section of a transfer mechanism of the first bale forming chamber may have the ability to rotate and hence may detect movement when the bale has reached a predefined diameter and is pressurised by the density control system. In another embodiment, as a result a density control located on another section of the first bale forming chamber, for example a top or a side wall section, may have the ability to rotate and hence may detect movement when the bale has reached a predefined diameter and is pressurised by the density control system. Also, the density control may be interacting or controlling on more than one section of the first bale forming chamber.

The density increases with the first bale forming chamber, the diameter of the chamber may increase in tandem with the density and therefore, there is a relationship between value of the density and the size of the bale of crop as the density starts to increase.

A density of the bale may be determined by the amount of crop pushed and pressed into the predefined cylinder shape outlined by the bale forming chamber. The greater the pressure exerted in the bale forming chamber on the bale to be formed the greater the volume of crop that can be pushed into the predefined chamber.

For the first bale forming chamber which may also referred to as prechamber, the first bale forming chamber door may rotate around a hinge point axis and may open in a generally upward position to release and transfer the bale into a second bale forming chamber which may also be referred to as main chamber. The bottom section of the first bale forming chamber acts as a transfer mechanism to transfer the bale into the second bale forming chamber. Before the bale can be transferred to the second bale forming chamber the density of the bale may be determined. The density may be set to a preselected value.

The first bale forming chamber door may remain in the closed position and therefore the bale in the first bale forming chamber will press on the bottom section (transfer mechanism) and/or some other section of the density control mechanism provided in the first bale forming chamber. With regard to the bottom section, this pressure may create a rotational movement, e.g. around the central axis of the rotor, and the rotational movement may be in the opposite direction to the rotational movement for the transfer of the bale into the second bale forming chamber. The downward movement or downward rotational movement may be restrained by restraining mechanism, for example, provided with a spring, hydraulic and or buffer type mechanism, in order to apply a predefined pressure to achieve a certain density of material within the bale.

After the transfer of the bale from the first bale forming chamber, the first bale forming chamber bottom section may rotate back into a chamber empty position and may stop at the density control mechanism—(the spring, hydraulic and/or buffers). It is understood this mechanism can be made up of any type of restraining device for example a spring, hydraulic and/or buffer.

In some embodiment, the bottom of the first bale forming chamber may have multiple tasks, first the transfer of the bale from the first bale forming chamber into the second bale forming chamber and second is the control of the density and/or the size of the bale prior to transfer into the second bale forming chamber. The bottom section of the first bale forming chamber which may also be referred to as prechamber may rotate in a one direction (positive direction), for the transfer of the bale into the second bale forming chamber and may rotate in an opposite direction (negative direction) when applying density to the preformed bale When the first bale forming chamber is in the empty or non-use state, the bottom section and/or some other section of the density control mechanism of the chamber may rest in a zero, neutral or rest position. The zero position may be determined by a setting of the density mechanism.

At the start of the cycle when feeding crop into the first bale forming chamber, the bottom section and/or some other section of the density control mechanism of the first bale forming chamber may remain in the zero position, as the bale increases to the diameter of the chamber, the bale starts to exert a force onto the respective section(s) of the first bale forming chamber, for example, rollers of the bottom section, and therefore also on a pivot point of the bottom section of the chamber. As a result, the bottom section and/or some other section of the density control mechanism may start to push off and rotate in the negative direction while applying density to the bale to be generated in the first bale forming chamber. When the round bale reaches a predetermined diameter, depending on the distance of rotation of the bottom section and/or some other section of the density control mechanism of the prechamber preselected, the system is alerted that the predefined density has being reached and the first bale forming chamber door may start to open and the door in turn may pull on the section of the first bale forming chamber. The bottom section and/or some other section of the density control mechanism may start to rotate in a positive direction reaching the zero point and surpassing the zero point in a positive direction and proceeding to transfer the bale into the second bale forming chamber.

The multiple functional bottom section of the first bale forming chamber is resting at a zero point and may then rotate in a negative or anticlockwise direction from the zero point during compaction of the pre-bale and during the transfer process starts to rotate in a positive direction (clockwise) through the zero point and beyond to rotate the transfer mechanism to transfer the bale into the second bale forming chamber.

In the first bale forming chamber, in order for shared rollers between the first bale forming chamber and the second bale forming chamber may remain in a fixed location during the baling process.

A door of the first bale forming chamber can remain in a fully closed position and can remain fully closed in order to maintain a consistent geometry between the common rollers shared between the two chambers and the shared fixed position roller between the two chambers. This may prevent crop from escaping between the two chambers if the first bale forming chamber door was to open for density control According to an alternative embodiment, the mechanism to detect the density can be basic, the mechanism may only need to apply a force when pushed against by the first bale forming chamber structure, and then when the bale is transferred from the first to the second bale forming chamber the section(s) of the first bale forming chamber may return to the zero position where the density control mechanism is coming to rest.

In an alternative embodiment of the configuration of density control, the density control may be loaded beyond the zero point in the negative direction, the density mechanism's preloaded state gives a positive pushing action to the start of the transfer cycle transferring the bale into the second bale forming chamber. The density control device may store potential energy due to the compression of the bale in the chamber acting on the bottom section and this potential energy then provides an initial surge at the beginning of the transfer process hence aiding in the transfer efficiency.

The density control mechanism may comprise any one of mechanical, hydraulic and/or electrical control unit. To give an example, a mechanical mechanism may be used.

A centre shaft may be allowed to move in a linear direction both a positive and negative direction in a bushing. A spring may be pre-compressed within an end of the shaft and the bushing and this spring may give the loading to apply the density to the bale of material. As the bale of material grows within the first bale forming chamber and reaches the outer boundary of the predefined diameter, the bale starts to apply a force on the chamber and as a result, the density mechanism starts to be pushed in a negative direction pushing and compressing the spring further of the mechanism and therefore applying a force to the bottom section of the first bale forming chamber and therefore a force onto the bale of crop within the chamber. The diameter of the bale will also grow in proportion to the density value as the density increases.

The density control mechanism which may be provided as a mechanical density control mechanism may be free of any external power supply to apply forces to the bale of crop. The force may be simply generated by the compressing of the spring, acting directly on the bottom section chamber structure and thereafter the rollers of the bottom section of the first bale forming chamber may press and apply forces to the bale of crop compressing and therefore increasing the density within the bale.

The first bale forming chamber bottom and top sections may be combined to determine the density of the bale. A combination of the movement from the bottom section and top door section may be recorded to determine the density of the bale in the first bale forming chamber. As described above the bottom section of the first bale forming chamber would rotate in a negative direction from the zero state as the bale inside the chamber becomes larger in diameter and denser. Also the top section of the first bale forming chamber could move in a positive direction only from the zero state position in tandem to the movement of the bottom section of the first bale forming chamber in a combined bale density control method. The restraining device for the first bale forming chamber door may be one of hydraulic, mechanical, electric or any other method obvious to a person with the skills in this area.

For the example, a pair of hydraulic cylinders may be used to open the first bale forming chamber door and also restrain the chamber door from opening to control and dictate the chosen density for the bale combined with the control of the bottom section of the first bale forming chamber rotating in a negative direction from the zero state. The door will be allowed to open a predefined distance under a controlled pressure in the cylinders and this pressure of oil within the cylinders will try and compress and squeeze the chamber door closed to compress the crop with the bale chamber and therefore providing density control to the bale in the chamber combined and in tandem with the density control from the bottom section of the first bale forming chamber.

The bottom section is implemented with multiple functionality. In addition to being an element of the transfer mechanism or unit, it forms a part of the density controller. The bottom section may form a cover over the feeding rotor during the transfer of a preformed bale into the second bale forming chamber. The multiple functionality may be implemented by processes with specific stages. In a stage one, when the first bale forming chamber becomes filled with crop, the bottom section starts to rotate in a negative direction past zero state position to detect the density of the preformed bale. In stage two, when a specific density is achieved, the bottom section moves, and transfers the preformed bale into the second bale forming chamber. With regard to a stage three, the bottom section provides a cover over the feeding mechanism to provide a covering barrier between the crop of the preformed bale and the rotary motion of the feeding mechanism, specifically the feeding rotor.

In the zero state or negative state conditions, the transfer mechanism, specifically the bottom section, acts predominately to detect density of the preformed bale. In the positive state, the transfer mechanism carries out the multiple functionality of supporting transfer or transferring of the preformed bale and providing a cover over or around the feeding mechanism.

BRIEF DESCRIPTION OF THE SEVERAL VIEWS OF THE DRAWINGS

Following, further embodiments are described. Reference is made to figures showing:

FIG. 6 a side elevation of the bottom section of the first bale forming chamber resting at the negative direction past the zero state position rotation in the anticlockwise direction; and FIG. 7 a side elevation of the bottom section of the first bale forming chamber resting in the fully up transfer position rotated in the fully positive direction up to and past the zero state position rotation in the clockwise direction

DETAILED DESCRIPTION

Figure 1:
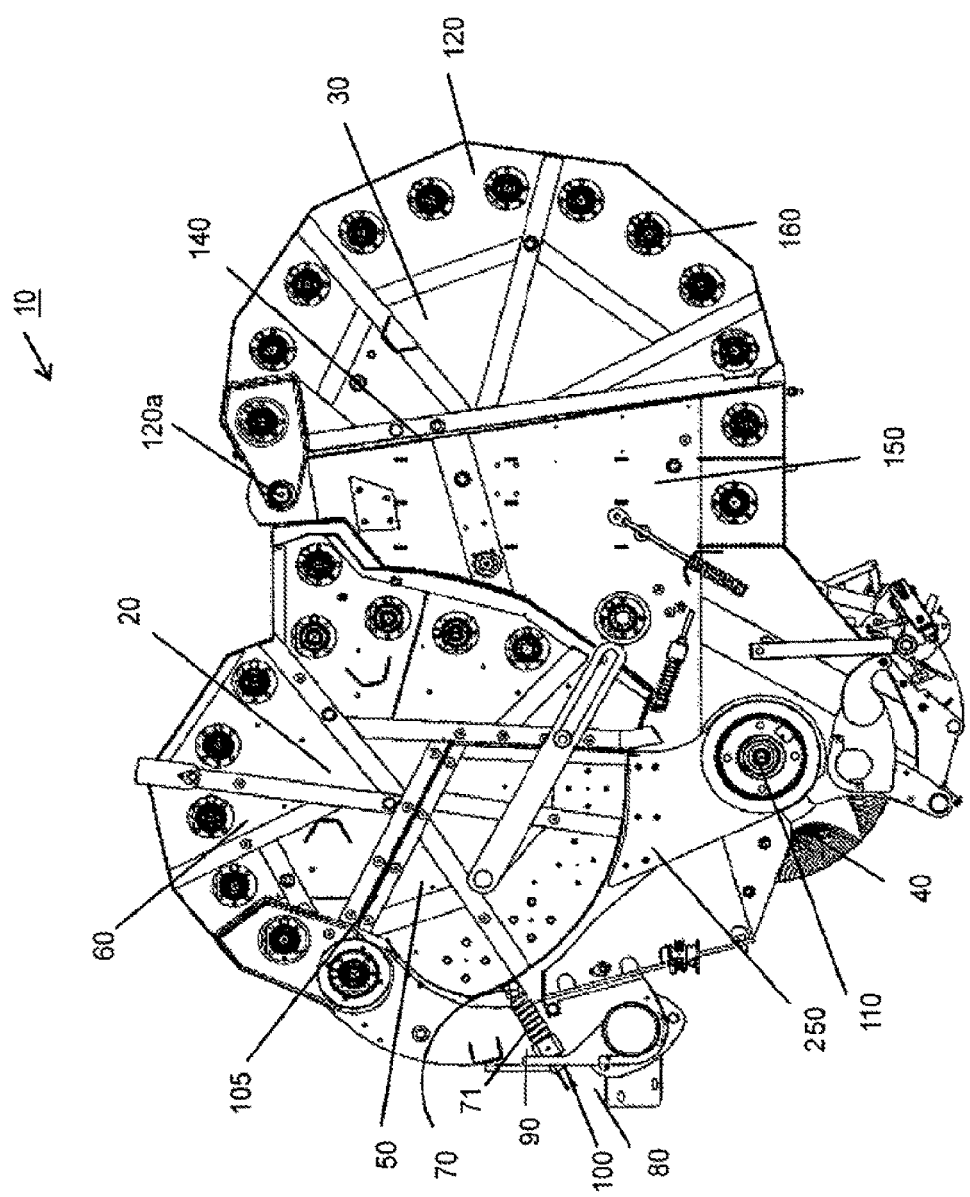
FIG. 1 a side elevation of a round baler device comprising a first bale forming chamber and a second bale forming chamber showing the first bale forming chamber in an empty state the first bale forming chamber being in a zero state with an adjoin line between the first bale forming chamber and the second bale forming chamber shown in the closed position.
Figure 2:
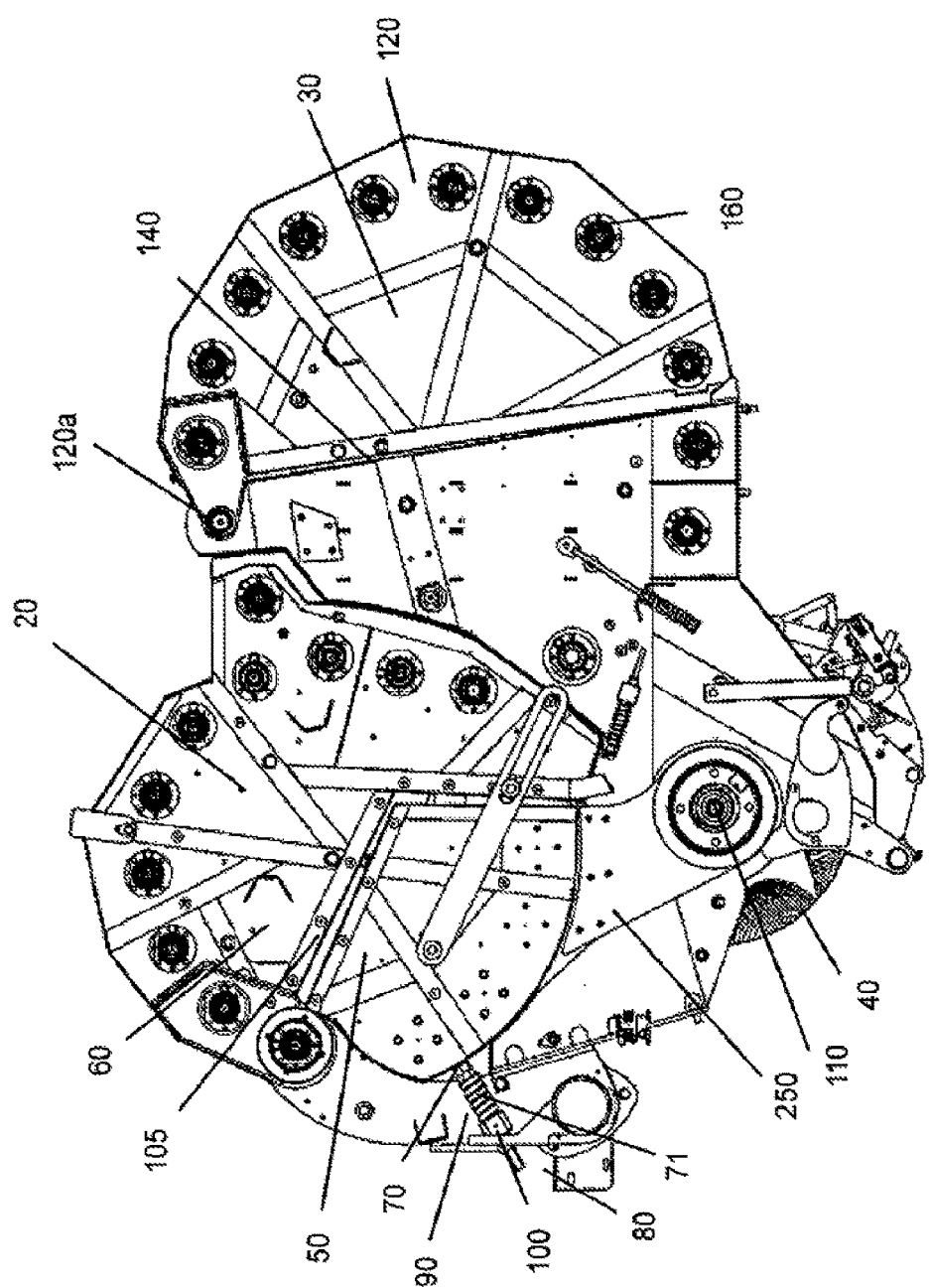
FIG. 2 a side elevation of the first bale forming chamber and the second bale forming chamber showing the first bale forming chamber in a full state with the adjoin line between the first bale forming chamber and the second bale forming chamber shown in the open position; the first bale forming chamber being rotated past the zero state in a negative direction (anticlockwise rotation) while applying forces to the bale in the first bale forming chamber.

Referring to FIGS. 1, 2, 3 and 4, a side view a round baler device 10 is shown. The round baler device 10 is of the non-stop type provided with a first bale forming chamber 20, and a second bale forming chamber 30.

At the start of a cycle, crop is taken into the round baler device 10 by a feeding/cutting mechanism 40 provided with a rotatable rotor 40a. The crop is pushing into the first bale forming chamber 20. The crop continues to flow into the first bale forming chamber 20 and at a point reaches a certain diameter and at this stage the bale of crop starts to push on a bottom section 50 and a top section 60 of the first bale forming chamber 20. The top section 60 may also be referred to as top door section. As the top section 60 is in a locked state, the bale of crop will press open the top section 60 which is a moveable section in a negative direction from a zero state (anticlockwise) and the structure of the bottom section 50 of the first bale forming chamber 20 pushes on a cap 70 of a pin 71 of a density control mechanism 80 which in turn pushes further on a preloaded spring 90 compressed between the pin 71 and a bushing mechanism 100.

As the pressure in the first bale forming chamber 20 increases, the force becomes greater than the force acting in the opposite direction by the spring 90 and its this force by the density control mechanism 80 which provides the method to press crop into the bale and provide more and more density as the bale is squeezed by the force of the spring 90 acting at a perpendicular pushing direction to the bottom section 50 of the first bale forming 20 chamber causing the bottom section 50 to rotate in a negative direction from the zero state or anticlockwise around a central axis 110 of the feeding mechanism 40.

As the rotation continues in a negative direction from the zero state, a joint line 105 between the two bale forming chambers 20, 30 starts to open allowing the bale to grow inside the first bale forming chamber 20 and be compressed providing a predefined level of density based on the set preloaded state and size of the spring 90 used on the density control mechanism 80, and the user defined setting of the value of the linear compression of the spring 90. The spring 90 may also be referred to as compression spring.

Figure 3:
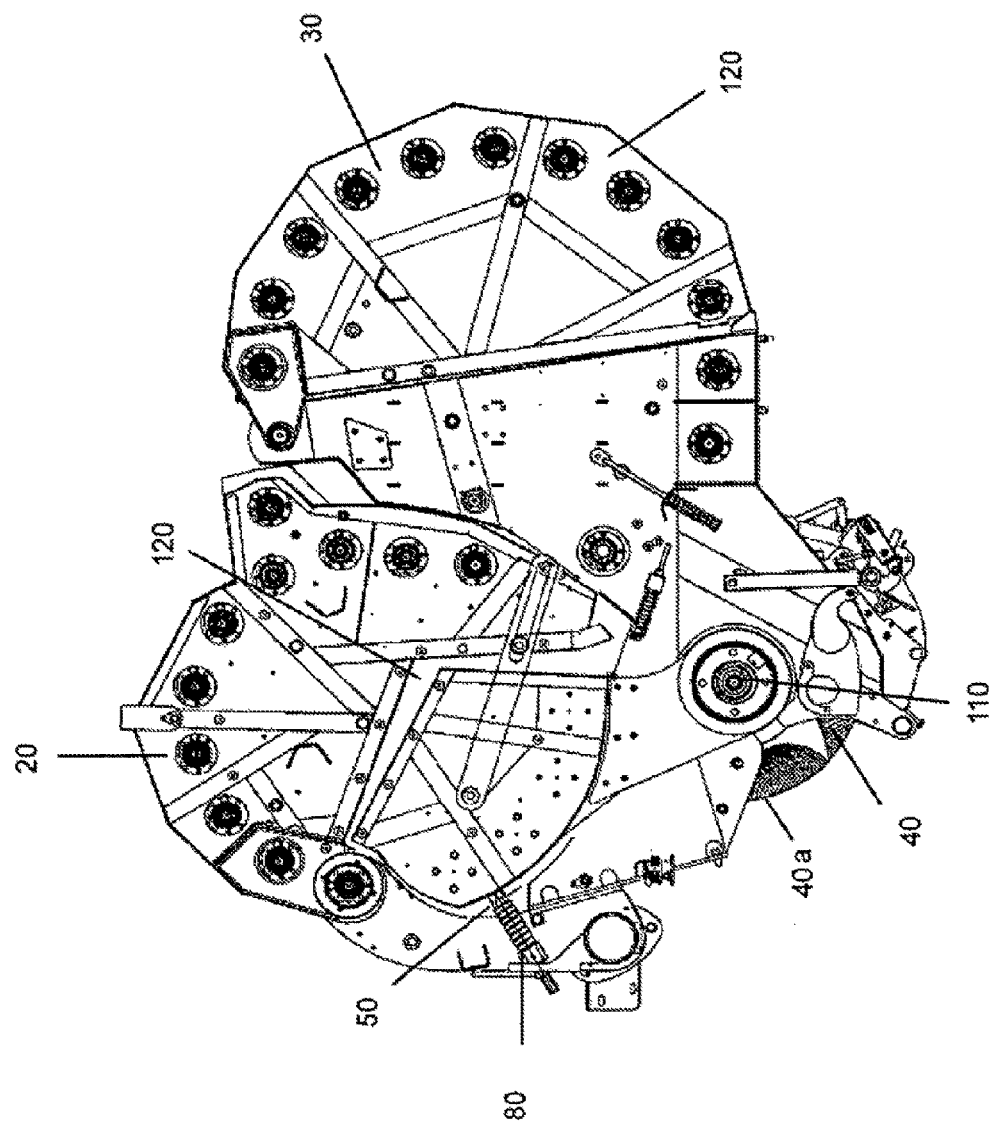
FIG. 3 a side elevation of the first bale forming chamber and the second bale forming chamber showing the first bale forming chamber at the start of a transfer mode with the bottom section of the chamber being lifted by the top section and transferring the bale into the second bale forming chamber, a density mechanism at this stage being returned to a zero state due to the first bale forming chamber bottom section rotating in the positive direction up to the zero state position awaiting the top door section to pull on the bottom section for the transfer of the bale.

FIG. 3 illustrates a next stage of the process, which may be referred to as transfer stage. FIG. 3 illustrates the start of the transfer stage and illustrates the bottom section 50 being part of a transfer mechanism of the first bale forming chamber 20 starting its initial rotation about the central axis 110 of the feeding mechanism 40. The rotor 40a is rotatable around the central axis 110. This initial rotation is initiated by the potential energy stored in the spring 90 of the density mechanism 80 from the compressing of the bale of crop and as a result when the top section 60 of the first bale forming chamber 20 starts to open, this potential energy stored in the spring 90 causes an initial surge of force acting on the structure of the bottom section 50 and therefore helping with the start of the transfer process of transferring the bale into the second bale forming chamber 30. Also at this moment of the top section 60 opening up and the bottom section 50 starting to move in a positive direction (clockwise), the zero state will of the bottom section 50 be reached. The bottom section 50 of the first bale forming chamber 20 will reach the zero state and then be positively projected through the transfer arc predominately around the central axis 110 of the feeding mechanism 40 pulled and rotated by the movement of the top section 60 of the first bale forming chamber 20 until the preformed bale is transferred into the second bale forming chamber 30.

Figure 4:
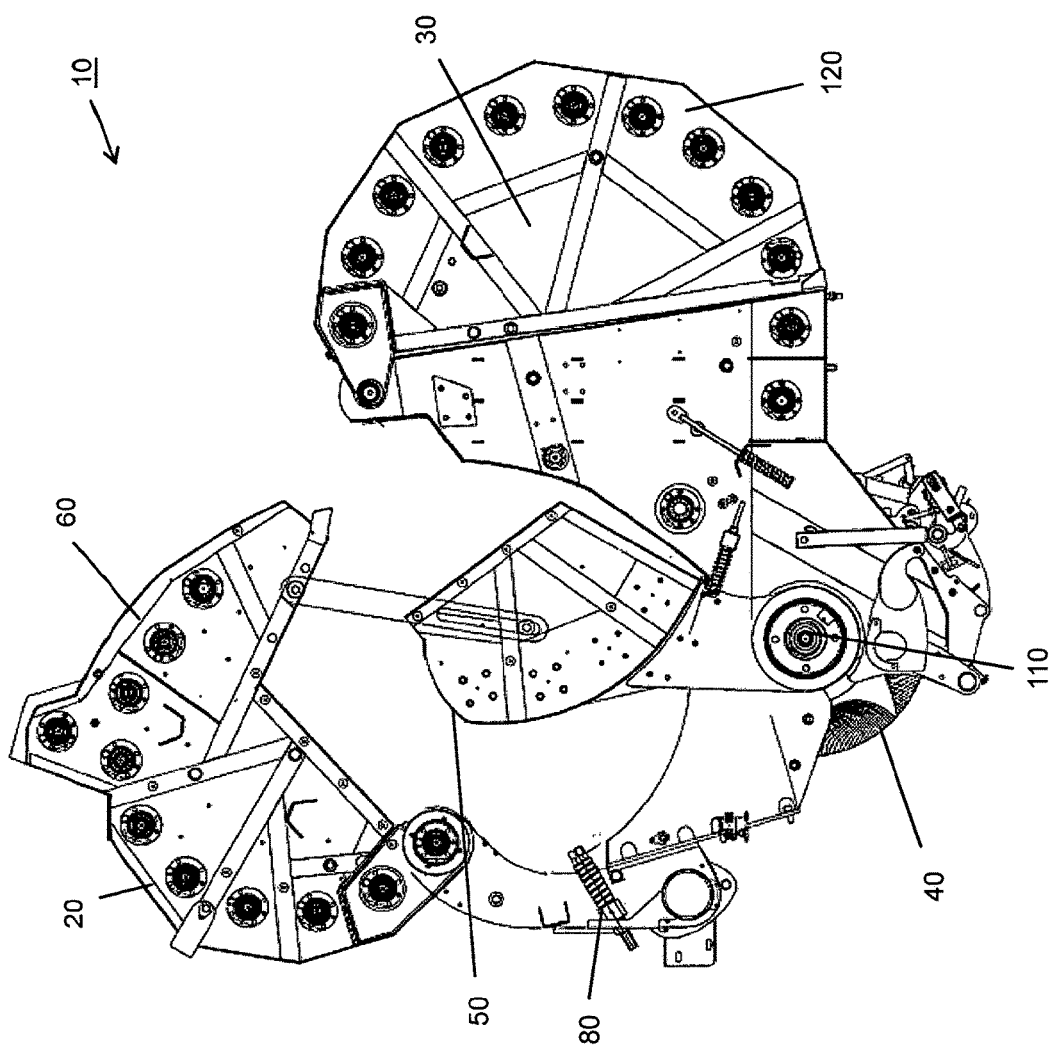
FIG. 4 a side elevation of the first bale forming chamber and the second bale forming chamber showing the first bale forming chamber in transfer mode with the bottom section of the chamber being lifted by the top section and transferring the bale into the second bale forming chamber, the density mechanism at this stage being returned to a zero state due to the first bale forming chambers bottom section rotating in the positive direction past the zero state and pushing the bale into the second bale forming chamber.

FIG. 4 illustrates the first bale forming chamber 20 at the end of the transfer cycle just before the sections of the first bale forming chamber 20 start to close again. In this state, the bottom section 50 has fully rotated in a positive direction from the zero state (clockwise rotation). For the next stage the first bale forming chamber 20 sections return again to the closed position as illustrated in FIG. 1, and the bottom section 50 of the first bale forming chamber 20 returns to rest in a zero state awaiting again the bale of crop to start pressing on it to regulate and increase the density of the bale in the first bale forming chamber 20.

When the bale is being completed in the second bale forming chamber 30, a door section 120 is controlled by a control system (standard in most type of one chamber balers) which may be a density control system and the control system controls the pressure on the door section 120 to control the density of the bale in the second bale forming chamber 30. As the density increases so does a distance 140 between boundary lines of a stationary part 150 of the second bale forming chamber 30 and the door section 120 of the second bale forming chamber 30 which rotating around an axis 120a. The control mechanism for the second bale forming chamber 30 controls the force pulling on the door section 120, therefore acting on rollers 160 and thereafter acting on the bale of crop so providing the predefined density of the completed bale. The door section 120 only moves in an outward direction both for density detection and for the releasing of the completed bale in the second bale forming chamber 30.

Figure 5:
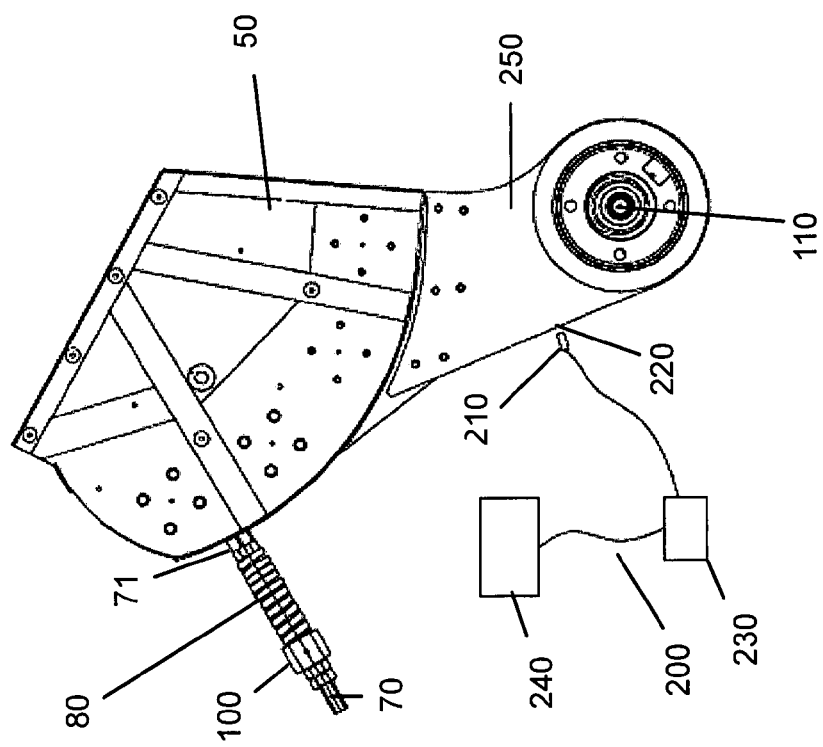
FIG. 5 a side elevation of the bottom section of the first bale forming chamber resting at the zero state position.

FIGS. 5, 6 and 7 schematically illustrate a density detection. The density of the bale formed is determined and calculated by observing movement of the bottom section 50 of the first bale forming chamber 20. FIG. 5 shows the bottom section 50 of the first bale forming chamber 20 in the zero state with a density detection system 200 density control mechanism 80 in rest position. An electronic sensor 210 picks up a distance 220 which is calibrated as the zero state position by a PCB 230 (Printed Circuit Board) provided with a CPU (Central Processing Unit), and this information is relayed back to a user interface monitor 240 so the operator can see the first bale forming chamber 20 is in the zero state with no compression being exerted on the bale of crop material.

FIG. 6 illustrates the first bale forming chamber 20 in a negative direction past the zero state or rotated in an anticlockwise rotation so the distance 220 between the electronic sensor 210 and a support structure 250 connected to the bottom section 50 is of a smaller value. Thus this value is fed back to the CPU and a value for the density is calculated and relayed back onto the user interface monitor 240 into for example a percentage reading value for the density of the bale of crop material in the first bale forming chamber 20.

FIG. 7 illustrates the density control mechanism in the fully up position or in a fully positive direction past the zero state condition. Therefore, the electronic sensor 210 has a large distance 220 between the electronic sensor 210 and the bottom section 50 support structure 250 and as a result the operator receives information that the first bale forming chamber 20 is in an open or transfer position.

The features disclosed in this specification, the figures and/or the claims may be material for the realization of various embodiments, taken in isolation or in various combinations thereof.

REFERENCE NUMERALS 10 round baler device
20 first bale forming chamber
30 second bale forming chamber
40 feeding/cutting mechanism
50 bottom section
60 top section
70 cap
71 pin
80 density control mechanism
90 spring
100 bushing mechanism
105 joint line
110 central axis
120 door section
120a axis
140 distance
150 stationary part
160 roller
210 electronic sensor
220 distance
230 PCB (Printed Circuit Board)
240 monitor
250 support structure

The invention claimed is:

1. A round baler for forming a bale from a crop product, comprising:
    a first bale forming chamber provided with a first bale forming mechanism;
    a second bale forming chamber provided with a second bale forming mechanism;
    a feeding mechanism comprising a rotor rotatable around a rotor axis of the feeding mechanism;
    a transfer mechanism comprising a bottom section of the first bale forming chamber; and
    a density controller configured to control a density of a preformed bale formed in the first bale forming chamber;
    wherein the density controller is operably connected to the bottom section of the first bale forming chamber, the bottom section being movable with regard to a zero state position, and in which movement of the bottom section in a negative direction past the zero state position controls the density of the preformed bale and movement in a positive direction to return to the zero state position and beyond the zero state position transfers the preformed bale into the second bale forming chamber.

2. The round baler according to claim 1, wherein the density controller comprises a preloaded compressing spring.

3. The round baler according to claim 1, wherein the bottom section is rotatable predominately around the rotor axis.

4. The round baler according to claim 1, further comprising a density detection system having a sensor for detecting movement of the bottom section.

5. The round baler according to claim 1, wherein the bottom section is forming a cover over the rotor in a position beyond the zero state position.

6. A method for forming a bale from a crop product in a round baler, the round baler comprising a first bale forming chamber provided with a first bale forming mechanism, and a second bale forming chamber provided with a second bale forming mechanism, and the method comprising:
    feeding crop into the first bale forming chamber by a feeding mechanism comprising a rotor rotatable around a rotor axis of the feeding mechanism;
    forming a preformed bale in the first bale forming chamber;
    controlling a density of the preformed bale by a density controller; and
    transferring the preformed bale from the first bale forming chamber to the second bale forming chamber by a transfer mechanism comprising a bottom section of the first bale forming chamber;
    wherein the density controller is operably connecting to the bottom section of the first bale forming chamber, the bottom section being movable with regard to a zero state position, and moving in a negative direction past the zero state position to control the density of the preformed bale and moving in a positive direction returning to the zero state position and beyond the zero state position to transfer the preformed bale into the second bale forming chamber.

7. The round baler according to claim 1, wherein the density controller comprises a preloaded compressing spring, and wherein the bottom section is rotatable predominately around the rotor axis.

8. The round baler according to claim 1, further comprising a density detection system having a sensor for detecting movement of the bottom section, and wherein the bottom section is rotatable predominately around the rotor axis.

9. The round baler according to claim 1, further comprising a density detection system having a sensor for detecting movement of the bottom section, and wherein the density controller comprises a preloaded compressing spring.

10. The round baler according to claim 1, further comprising a density detection system having a sensor for detecting movement of the bottom section, wherein the density controller comprises a preloaded compressing spring, wherein the bottom section is rotatable predominately around the rotor axis, and wherein the bottom section is forming a cover over the rotor in the position beyond the zero state position.

11. The round baler according to claim 1, further comprising a density detection system having a sensor for detecting movement of the bottom section, wherein the bottom section is rotatable predominately around the rotor axis, and wherein the bottom section is forming a cover over the rotor in the position beyond the zero state position.

12. The round baler according to claim 1, further comprising a density detection system having a sensor for detecting movement of the bottom section, wherein the density controller comprises a preloaded compressing spring, and wherein the bottom section is rotatable predominately around the rotor axis.

13. The round baler according to claim 1, wherein the density controller comprises a preloaded compressing spring, and wherein the bottom section is forming a cover over the rotor in the position beyond the zero state position.

14. The round baler according to claim 1, wherein the bottom section is rotatable predominately around the rotor axis, and wherein the bottom section is forming a cover over the rotor in the position beyond the zero state position.

15. The round baler according to claim 1, further comprising a density detection system having a sensor for detecting movement of the bottom section, and wherein the bottom section is forming a cover over the rotor in the position beyond the zero state position.

16. The round baler according to claim 1, wherein the density controller comprises a preloaded compressing spring, wherein the bottom section is rotatable predominately around the rotor axis, and wherein the bottom section is forming a cover over the rotor in the position beyond the zero state position.

17. The round baler according to claim 1, further comprising a density detection system having a sensor for detecting movement of the bottom section, wherein the bottom section is forming a cover over the rotor in the position beyond the zero state position, and wherein the density controller comprises a preloaded compressing spring.

* * * * *